(12) United States Patent
Whiteford

(10) Patent No.: US 6,394,432 B1
(45) Date of Patent: May 28, 2002

(54) VIBRATION AND/OR SHOCK ABSORBING DEVICES AND COMPENSATOR ELEMENTS UTILIZED THEREIN

(75) Inventor: Gerald P. Whiteford, Waterford, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/095,207

(22) Filed: Jun. 10, 1998

(51) Int. Cl.$^7$ .................................................. F16F 5/00
(52) U.S. Cl. ............... 267/140.13; 267/293; 267/141.1; 267/140
(58) Field of Search ................ 267/140.11, 140.12, 267/140.13, 140.14, 140.15, 293, 136, 141.1, 219, 140; 248/562, 636, 638; 188/378, 379

(56) References Cited

U.S. PATENT DOCUMENTS

| | | | |
|---|---|---|---|
| 4,811,919 A | | 3/1989 | Jones |
| 5,413,320 A | | 5/1995 | Herbst |
| 5,540,549 A | * | 7/1996 | Mcguire ............ 267/140.13 X |
| 5,642,873 A | * | 7/1997 | Kato ..................... 267/140.14 |
| 5,704,598 A | * | 1/1998 | Kojima .................. 267/140.13 |
| 5,762,295 A | * | 6/1998 | McGuire et al. .... 267/140.15 X |
| 5,947,457 A | * | 9/1999 | Swanson et al. ....... 267/140.14 |
| 5,957,440 A | * | 9/1999 | Jones et al. ............ 267/140.14 |
| 6,045,328 A | * | 4/2000 | Jones ................ 267/140.13 X |
| 6,056,279 A | * | 5/2000 | Lee et al. .............. 267/140.13 |

FOREIGN PATENT DOCUMENTS

| | | |
|---|---|---|
| DE | 1805392 | 2/1960 |
| DE | 28 38 595 A1 | 3/1980 |
| EP | 0 831 246 A2 | 3/1998 |
| FR | 2.168.680 | 8/1973 |
| WO | WO 97/30895 | 8/1997 |

* cited by examiner

Primary Examiner—Christopher P. Schwartz
Assistant Examiner—Melanie Torres
(74) Attorney, Agent, or Firm—Michael M. Gnibus; Randall S. Wayland

(57) ABSTRACT

A device for absorbing vibration is disclosed, along with compensator elements for use therein. The device comprises a primary fluid system for dynamic isolation and/or damping, and a volume compensator having an auxiliary chamber fluidly interconnected with, but dynamically isolated from, the primary fluid system. The volume compensator features a compensator element having an elastic layer in fluid communication with the auxiliary chamber and disposed in sealing engagement within the device. The compensator element advantageously comprises a deformable elastomer stiffener cooperative with the elastic layer for providing static pressurization to the primary fluid system. The compensator element may further provide a reduced rate of change in volume stiffness characteristic that allows the fluid pressure in the primary fluid system to increase at a reduced rate. Further, the reduced rate characteristic prevents excessive static pressure swings. The compensator element may further comprise a seal bead. Additionally, the device features an adhesive bond fluidly sealing at least one end of the primary fluid system.

34 Claims, 9 Drawing Sheets

VIBRATION AND/OR SHOCK ABSORBING DEVICES AND COMPENSATOR ELEMENTS UTILIZED THEREIN

FIELD OF THE INVENTION

The present invention relates to vibration and/or shock absorbing devices, and more particularly, to an elastomer and fluid-filled device for isolating and damping vibration and shock between translating structures. The present invention also relates to compensator elements advantageous for use in vibration and/or shock absorbing devices.

BACKGROUND

Devices utilizing elastomers and fluid-filled chambers have been used for isolating and damping vibration and shock. These devices are typically used in the transportation industry, such as in mounts for aircraft and automobile engines.

The combination of elastomer elements and fluid-filled chambers is desirable for improving the overall isolating and damping characteristics of the device. The elastomer element is mainly responsible for bearing the load, but also provides some damping. Conversely, although offering little load bearing support, fluid-filled chambers can be designed to dramatically improve the isolation and damping characteristics of the device. These devices are often designed to perform best at specific "tuned" or "notch" frequencies. Most of these devices require volume compensators to accommodate variations in the pressure of the fluid caused by temperature and/or volume changes.

An example of such a device is a fluid-filled mount, which generally includes a pair of opposed variable volume fluid-filled chambers separated by an elongate passageway or track. Within the track is a mass or slug of fluid that may be designed to vibrate out of phase with the vibrations of the system, thus canceling or reducing the transmitted vibration. Thus, the track provides a fluid mass of a desired configuration that enables the mount to be designed, or tuned, to provide desirable dynamic operating characteristics.

There are two types of mounts: a single-action type and a double-action type. A single-action mount has one chamber with a substantially higher volume stiffness than the other. Changes in the volume of the higher stiffness chamber, such as by changes in ambient temperature, are relieved by changes in the volume of the lower stiffness chamber. On the other hand, double-action mounts have two high volume stiffness chambers. While double-action mounts may provide desirable dynamic operating characteristics over single-action mounts, such as increased volume stiffness, changes in the ambient temperature adversely affect their performance. A dynamically isolated, low volume stiffness chamber, typically referred to as a volume compensator chamber, may be connected to double-action mounts to enhance their performance. One such example is found in U.S. Pat. No. 4,811,919 to Jones, issued to the assignee of the present application.

In an attempt to insure that the designed performance is achieved, many prior art devices incorporate mechanisms to account for variations in the volume and pressurization of the fluid. Typically, these devices incorporate an elastic compensator element adjacent to the fluid-filled chamber to compensate for changes in the fluid volume in order to maintain a designed fluid pressure. The elastic compensator element may form a wall of the fluid-filled chamber, or the compensator element may comprise an additional chamber separate from, but interconnected with, the fluid-filled chamber. Examples are found in U.S. Pat. No. 5,413,320 to Herbst and WO 97/30895 to McGuire.

A potential problem with the use of a compensator element, however, is that the elasticity and spring rate of the compensator element is often not sufficient to insure proper pressurization of the fluid. In these cases, additional mechanisms are required. Prior art devices have utilized gas pressurized chambers and/or mechanical springs cooperating with the compensator element and fluid-filled chamber. These mechanisms supply the compensator element with additional resistance to deformation and thereby insure the designed fluid pressure within the fluid-filled chamber. These solutions, however, may be disadvantageous by adding additional parts, cost, space and weight to the device.

For example, gas pressurized or air-tight chambers generally require precisely machined parts and additional sealing elements to maintain their pressurization. Because of the difficulty in sealing these chambers, it is not uncommon for them to lose some of their pressurization. A change of pressurization in these chambers, however, can result in loss of performance under certain conditions. Further, many pressurized chambers require expensive valves to supply and maintain the chamber pressure. Additionally, the spring rate caused by a pressurized chamber generally increases with increased pressure in the device, which can lead to performance degradation as the pressure of the fluid exceeds the designed pressure. Thus, there are numerous disadvantages to utilizing pressurized chambers cooperating with an elastomer compensator element.

Similarly, the use of mechanical springs may be disadvantageous. Springs, usually in combination with a metal plate or piston adjacent to the compensator element, add additional parts, complexity and weight to a device. Further, the use of springs may require additional space for compression and expansion, and thus add additional bulk to the device. Springs also may disadvantageously affect performance because of their increasing spring rate up to their compressive limit. As with pressurized chambers, this increased spring rate may cause the fluid in the device to exceed the designed pressure and thereby adversely affect the performance of the device. Therefore, mechanical (helical or conical coil) springs, like air pressurized chambers, may disadvantageously increase the cost, complexity, maintainability and weight of isolation and damping devices.

Further, in certain prior art devices, plates form a wall of a fluid-filled chamber. In combination with bolts and o-rings, for example, the plate seals in the fluid. All of these components add cost to the device, both in material and in assembly time. Additionally, difficulties often arise in completely filling and satisfactorily sealing a chamber full of fluid, as the placement and tightening of the plate tend to cause the fluid to overflow and get between the plate and the o-ring, causing a bad seal. Also, improper sealing or defects in the o-ring can lead to a loss of fluid, and thus a degradation or loss of performance of the device. Thus, a solution to these problems is desired to reduce the cost and improve the performance of isolation and damping devices.

SUMMARY OF THE INVENTION

The present invention overcomes the above-noted disadvantages of prior art isolators and dampers. In a first aspect, the present invention comprises a compensator element, for use in a vibration control device having a housing and at least one fluid-filled chamber, comprising an elastic layer in fluid communication with the fluid-filled chamber and disposed in sealing engagement with a portion of the device, and a deformable elastomer stiffener cooperative with the elastic layer for providing static pressurization to the at least one fluid-filled chamber. The stiffener is preferably integral with the elastic layer, thereby comprising a one-piece compensator element that is economically manufactured, such as by molding. In one preferred embodiment, the stiffener comprises a cylindrical column. The configuration of the compensator element and stiffener may vary by application and desired performance, however, and may comprise other shapes. For example, the compensator element may be oval or square and the stiffener may comprise one column or a plurality of columns. The plurality of columns may be co-axial cylindrical columns. Also, other stiffener configurations, such as square columns, oval columns, a plurality of dividing walls, etc. may be utilized. Further, the compensator element may comprise a seal bead along the perimeter of the deformable structure. The bead forms a seal to contain a fluid in the fluid-filled chamber.

Additionally, compensator element beneficially may provide a reduced rate of change in volume stiffness between a point of initial deformation and a point of maximum deformation. Similarly, the stiffener may have a reduced rate of change in spring rate that corresponds to the reduced rate of change in volume stiffness of the compensator element. The reduced rate of change in volume stiffness is a result of the volume stiffness decreasing at a point corresponding to the substantial collapse of the stiffener member.

In another aspect, the present invention comprises a device for controlling vibration and/or shock between two structures, comprising a housing for fastening to a first structure, a variable volume fluid chamber, and a support for attaching to a second structure. Translation between the housing and the support changes the fluid pressure within the chamber. Further, the present invention provides a deformable compensator element having an elastic layer in fluid communication with the fluid-filled chamber and disposed in sealing engagement with a portion of the device, and a deformable elastomer stiffener cooperative with the elastic layer for providing static pressurization to the fluid chamber. The compensator element may further comprise a seal bend along the perimeter of the elastic layer. The bead forms a seal to contain fluid in the fluid chamber. Additionally, the fluid chamber may be sealed at the housing with a bond formed utilizing an adhesive, such as acrylic or epoxy.

The compensator element may further have a reduced rate of change in volume stiffness between a point of initial deformation and a point of maximum deformation. The rate of change in volume stiffness decreases at a point corresponding to the substantial collapse of the stiffener. Similarly, the stiffener preferably has a reduced rate of change in spring rate that corresponds to the reduced rate of change in volume stiffness of the compensator element.

In a further aspect, a double-action fluid mount comprises a primary fluid system, a volume compensator and a deformable compensator element. The primary fluid system is defined by a first variable volume fluid chamber fluidly interconnected to a second variable volume fluid chamber. The volume compensator has an auxiliary chamber fluidly connected to, but dynamically isolated from, the primary fluid system. The compensator element comprises ail elastic layer in fluid communication with the auxiliary chamber and disposed in sealing engagement with the volume compensator, and a deformable elastomer stiffener cooperative with the elastic layer for providing static pressurization to the primary fluid system. Preferably, the stiffener member is integrally formed with the compensator element. The stiffener may form a cylindrical column or a plurality of columns. The stiffener preferably has a reduced rate of change in spring rate that corresponds to a reduced rate of change in volume stiffness of the compensator element. The reduced rate of change in volume stiffness is a result of the volume stiffness decreasing at a point corresponding to the substantial collapse of the stiffener member.

The mount may also comprise a housing for attachment to a first structure. Within the housing is an elastomer member that at least partially forms the first variable volume chamber and the second variable volume chamber. A support, connected to a piston that divides the first chamber and the second chamber, may be provided for attachment to a second structure. Additionally, a seal bead formed at the perimeter of the compensator element seals one end of the auxiliary chamber. Also, the invention may comprise an adhesive bond between the housing and the elastomer member to seal one end of one of the variable volume fluid chambers.

In one feature, the present invention advantageously comprises a volume compensator having an integral stiffener that provides additional volume stiffness.

In another feature the present invention provides a volume compensator having a reduced number of parts, which increases the reliability of the device.

An advantage of the present invention is its reduced cost and increased maintainability.

A further feature of the present invention is to provide an efficient compensator that maximizes the compensator volume for a given space by eliminating parts.

Another advantage of the device is the adhesive bond that seals, at least at one end, a variable volume fluid chamber, thereby eliminating mechanical parts and increasing reliability.

Further features and advantages of the present fluid-filled vibration and/or shock absorbing devices and compensator elements for use therein are provided by the drawing figures and the following more detailed description.

BRIEF DESCRIPTION OF THE DRAWINGS

FIG. 9b is a cross-sectional side view of the compensator element along line 9b—9b in FIG. 9a;

FIG. 10b is a cross-sectional side view of the compensator element along line 10b—10b in FIG. 10a;

FIG. 11b is a cross-sectional side view of the compensator element along line 11b—11b in FIG. 11a;

FIG. 12b is a cross-sectional side view of the compensator element along line 12b—12b in FIG. 12a;

FIG. 13b is a cross-sectional side view of the compensator element along line 13b—13b in FIG. 13a;

FIG. 14b is a partial cross-sectional perspective view of the compensator element of FIG. 14a;

DETAILED DESCRIPTION OF THE INVENTION

In a first aspect, the present invention comprises a compensator element comprising an elastic layer cooperating with a deformable elastomer stiffener. Preferably, the stiffener is integral with the elastic layer so as to form an economically manufacturable one-piece compensator element. Additionally, the compensator element may comprise a seal bead about its perimeter to maximize the volume of a chamber created by the deformation of the compensator element. Further, the compensator element is capable of communicating with a fluid, and may form a wall of a fluid-filled chamber, such as in a vibration control device.

In another aspect, the present invention provides a device utilizing an elastomer member, which is preferably columnar, in combination with a fluid-filled chamber for isolating and damping vibration and/or shock. The device features an integrally stiffened compensator element cooperating with the fluid-filled chamber for providing static pressurization to the chamber. The vibration and shock absorbing device further comprises a housing attachable to a first structure and a support attachable to a second structure. The housing and support are in communication with each other through the elastomer member and fluid-filled chamber, which act together to support the structures and to isolate and damp the motion of the structures.

The present invention advantageously provides the integrally stiffened compensator element within a compensator chamber fluidly interconnected to the fluid-filled chamber, thereby allowing the fluid-filled chamber volume to vary to maintain a desired fluid pressure. The present invention also provides an adhesive bond between the elastomer member and the housing or support, which at least partially defines the fluid-filled chamber and eliminates mechanical parts and increases reliability. Thus, the integrally stiffened compensator element and the adhesive bond sealing the fluid-filled chamber synergistically provide a less expensive, less complicated, less weighty, more compact and more reliable device for isolating and damping vibration and/or shock.

Figure 1:
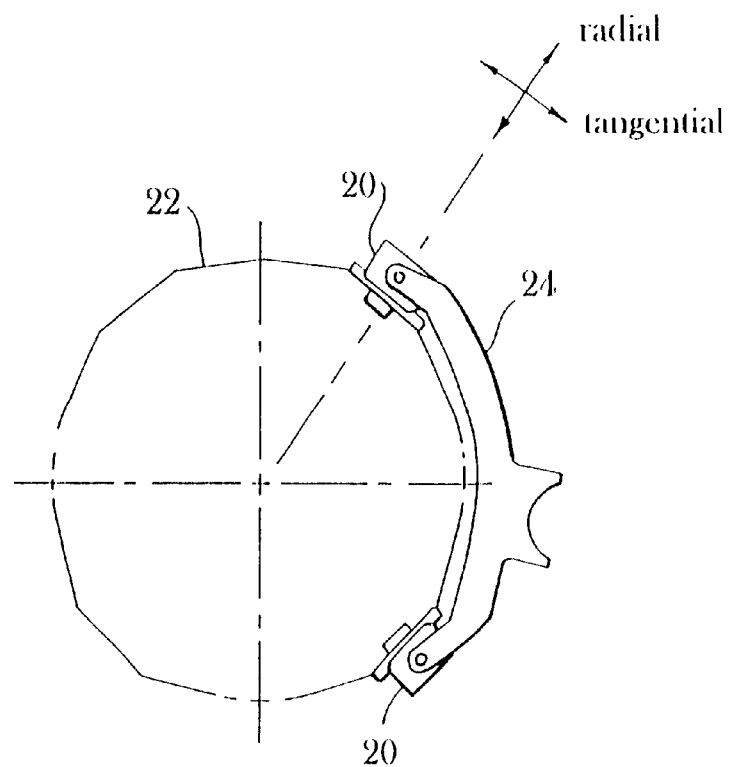
FIG. 1 is a front view of an engine equipped with multiple ones of a preferred embodiment of fluid-filled vibration isolator in accordance with the present invention.
Figure 2:
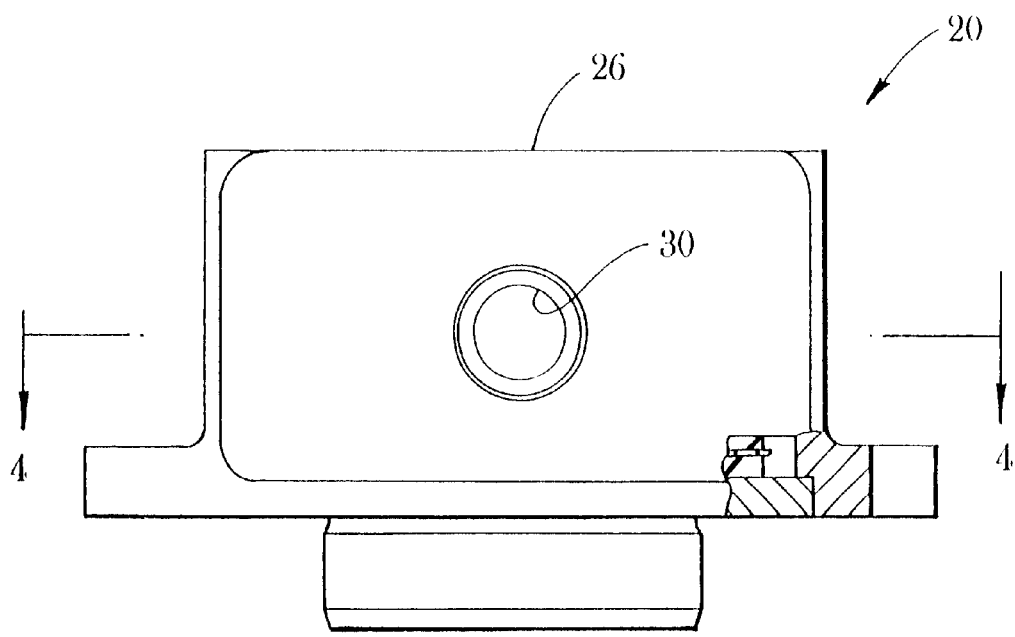
FIG. 2 is a front view of an embodiment of one preferred fluid-filled isolator of the present invention.
Figure 3:
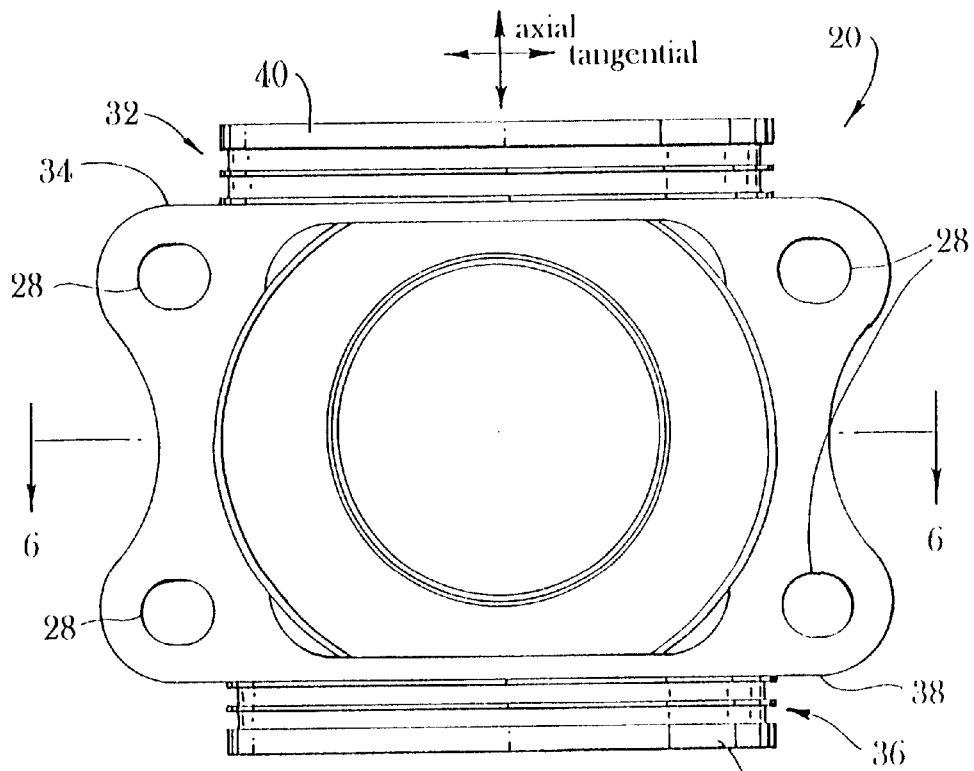
FIG. 3 is a bottom view of the isolator of FIG. 2.

Referring to FIGS. 1–3, one preferred embodiment of the present invention comprises a hydraulic double-action isolator 20 utilized, for example, to attach an aircraft engine 22 to a support strut 24 interconnecting to an aircraft fuselage (not shown). Housing 26 may be attached to engine 22 by securing bolts through mounting holes 28. Engine 22 and isolator 20 may then be attached to strut 24 by securing a bolt through a support 30, such as a sleeve, within housing 26. Thus, isolator 20 provides support and vibration isolation for engine 22.

Figure 4:
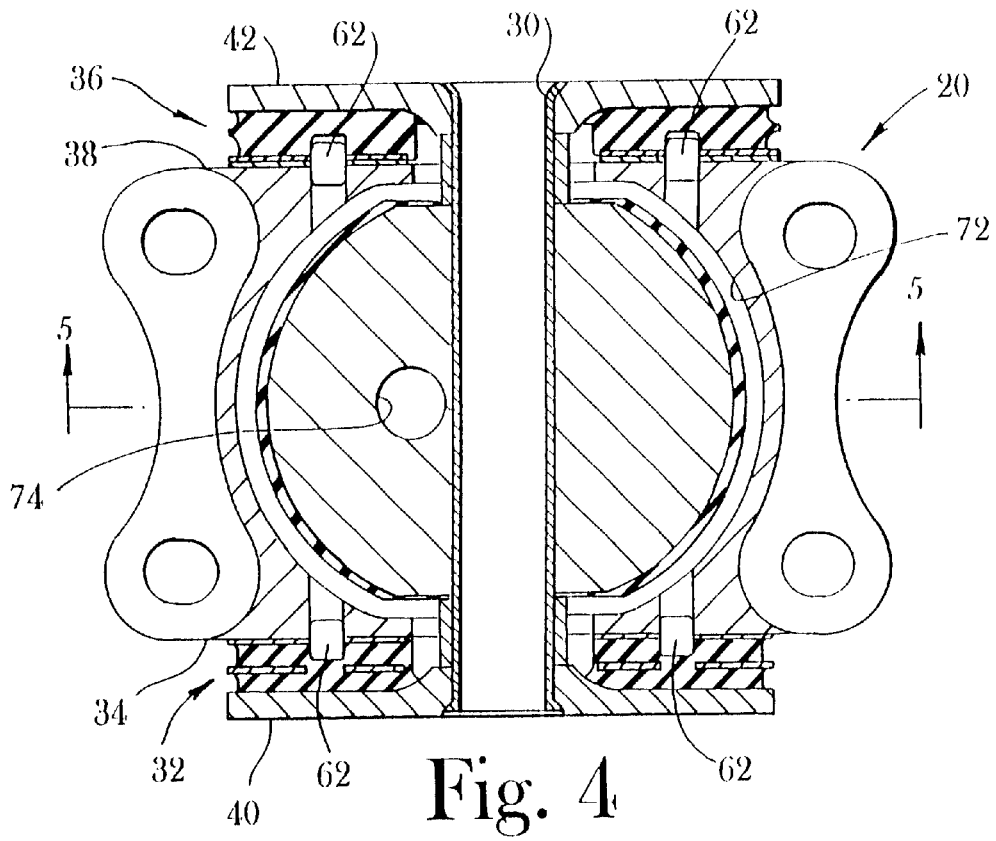
FIG. 4 is a cross-sectional top view taken along line 4—4 of FIG. 2.

Isolator 20 provides support by having a high static stiffness in the axial (thrust) and radial directions, while having a low static stiffness tangential to the engine. Referring now to FIGS. 3 and 4, axial loads are transmitted through first elastomeric element 32 on the forward surface 34 of housing 26 and second elastomeric element 36 on the aft surface 38 of the housing. First and second elastomeric elements 32 and 36 are clamped between housing 26 and surface plates 40 and 42 by sleeve 30, such as by swaging the ends of the sleeve 30. Additionally, first and second elastomer elements 32 and 36 are preferably vulcanized to plates 40 and 42 and attached to housing 26 with pills 62, but other known methods may be utilized such as adhesive bonding.

Figure 5:
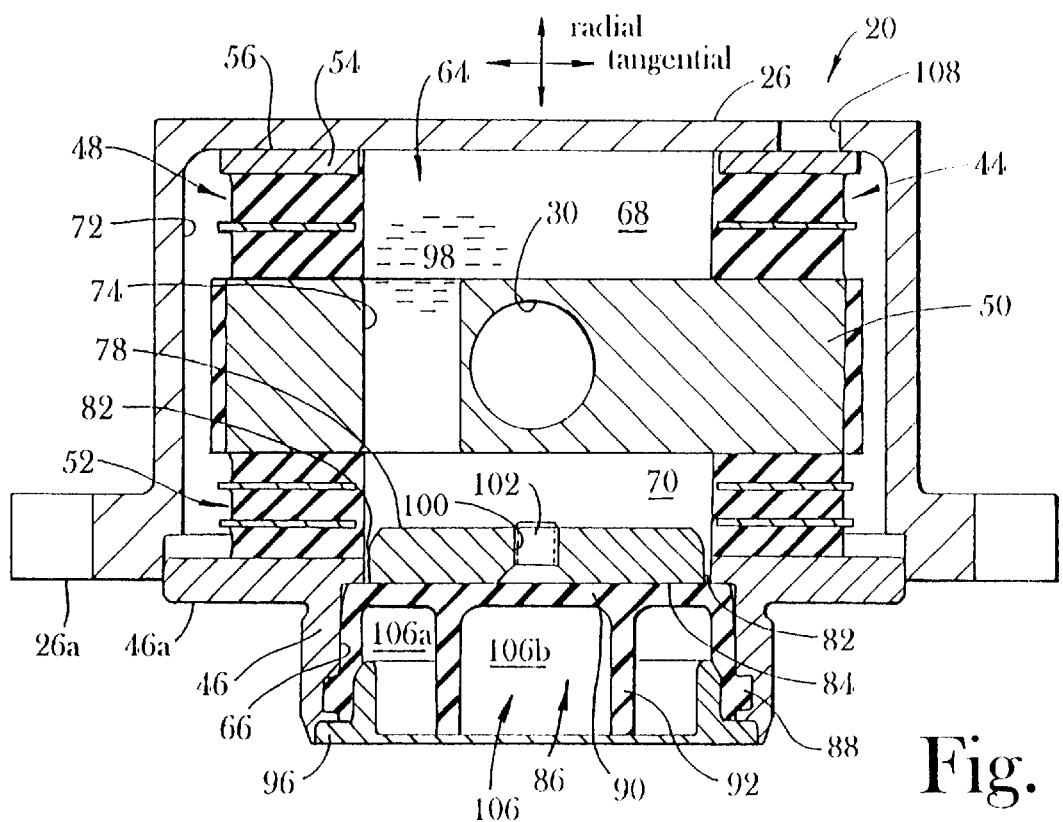
FIG. 5 is a cross-sectional side view taken along line 5—5 in FIG. 4.
Figure 6:
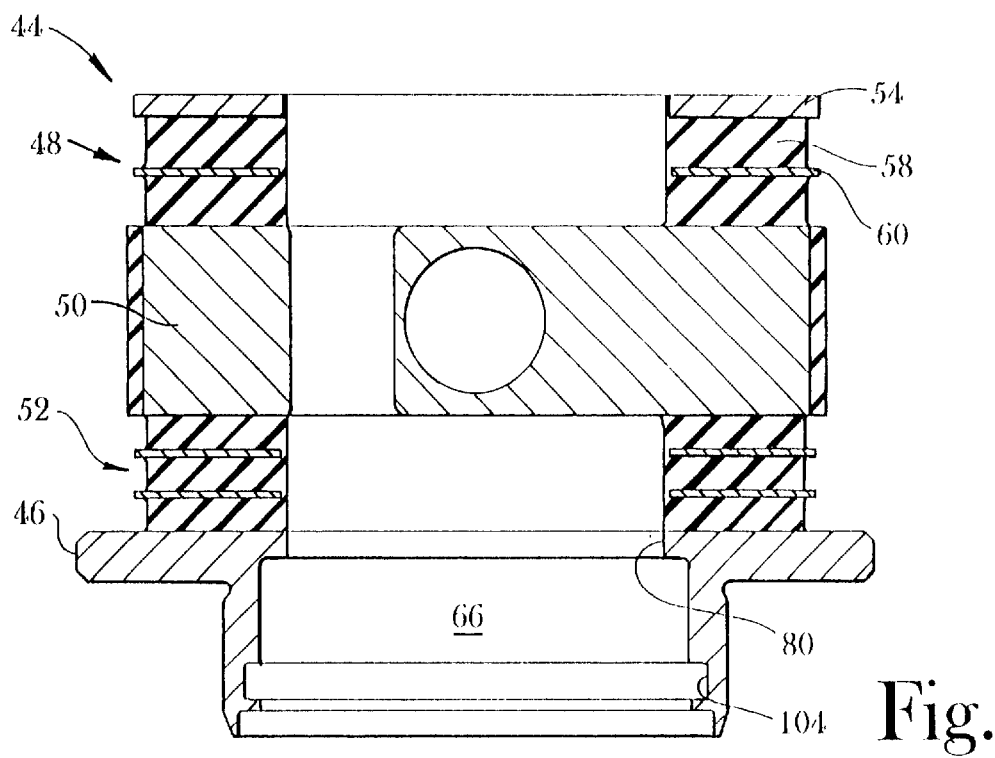
FIG. 6 is a cross-sectional view, taken along line 6—6 in FIG. 3, of the elastomer element and pilot with the housing and a number of other components removed for clarity.

Referring to FIGS. 5 and 6, radial loads are transmitted though elastomer member 44, bonded at one end to housing 26 and at the opposing end to pilot 46. Elastomer member 44 comprises third elastomeric element 48 laminated between piston element 50 and housing 26 and fourth elastomeric element 52 laminated between the piston element and pilot 46. The bonds between elastomeric elements 48 and 52 and piston element 50, as well as the bond between elastormeric element 52 and pilot 46, are conventional bonds formed between elastomer and metal, preferably aluminum, during the vulcanization bonding process. On the other hand, the top surface of third elastomeric element 48 comprises plate 54, preferably aluminum, which is adhesive bonded to the inner surface of housing 26. The face-to-face adhesive bond 56 has a number of advantages.

The use of adhesive bond 56 enables housing 26 and elastomer member 44 to be quickly and easily assembled, without the need for extra hardware such as plates, o-rings and screws to seal upper chamber 68. In assembling isolator 20, elastomer member 44 is sealed to housing 26 by bond 56, preferably formed with an adhesive such as acrylic or epoxy. Other types of adhesives may be used, however, depending on the operating environment. Additionally, bond 56 advantageously increases the reliability of the seal and avoids the problem of fluid overflowing and leaking during installation of the o-ring and top plate, as in prior art devices.

Elastomer elements 32, 36, 48, 52 are preferably alternating, laminated layers of elastic elements 58, such as an elastomer or rubber, and inelastic elements 60, such as a metal shim (FIG. 6). Elastomer elements 32, 36, 48 and 52, however, may also be formed of solid elastomer or rubber. The laminated layers of elastomer 58 and shims 60 are preferred for providing higher stability and stiffness to the device.

By way of example and not limitation, isolator 20 for mounting an aircraft engine may be designed with the following static spring rates:

$K_{axial}$=25,000 to 100,000 lb/in $K_{rad}$=20,000 to 100,000 lb/in $K_{tan}$=2,500 to 12,000 lb/in where $K_{axial}$ is the static spring rate in the axial direction, $K_{rad}$ is the static spring rate in the radial direction and $K_{tan}$ is the static spring rate in the tangential direction. It should be noted, however, that the design of the static spring rates may vary dramatically depending on the operating environment.

With reference to FIGS. 3–5, the variations in the spring rates can be explained. The static spring rate in the axial direction, $K_{axial}$, and hence the compressive stiffness of elements 32 and 36 is primarily intended to resist the thrust of the engine. Meanwhile, the compressive stiffness of elements 48 and 52, and $K_{rad}$, is primarily intended to resist the weight of the engine. Finally, the static stiffness in the tangential direction, $K_{tan}$, is much less than in the other directions because loads in the tangential direction place each of elements 32, 36, 48 and 52 in shear.

Similarly, loads in the radial direction place elements 32 and 36 in shear. A plurality of pins 62 (FIG. 4) are used to transmit the tangential and radial shear from engine 22 via housing 26 through pins 62 (FIG. 4) to elastomeric elements 32 and 36. And then the shear is transmitted through plates 40 an d 42 to sleeve 30, and finally to strut 24 by the isolator's attachment bolt.

In addition to providing support, isolator 20 is designed to provide vibration isolation through elastomeric and fluid isolation. Within housing 26, referring to FIGS. 4–5, elastomer member 44 and primary fluid system 64 provide vibration isolation between engine 22 and strut 24. Also, primary fluid system 64 provides low dynamic stiffness to absorb high frequency vibrations. Moreover, the fluid may provide a level of damping augmentation.

Primary fluid system 64 comprises upper chamber 68 and lower chamber 70 that are formed, in part, by elastomer member 44 and separated by piston element 50. Piston element 50 is a truncated circular disk moving within a similarly cross-sectioned chamber 72 within housing 26 (FIG. 4). Chambers 68 and 70 are connected by inertial track passage 74 through piston element 50, where movement of the piston element displaces fluid between the chambers 68 and 70 through passage 74. Sealing one end of upper chamber 68 is adhesive bond 56 between elastomer element 48 and housing 26, while one wall end of lower chamber 70 is formed by an orifice plate 78, which is press fit into, or otherwise secured in, opening 80 (FIG. 6).

Referring to FIG. 5, plate 78 separates primary fluid system 64 from volume compensator chamber 66 which is preferably located within pilot 46. At least one isolation orifice, and preferably a plurality of isolation orifices 82, formed in plate 78 interconnect volume compensator chamber 66 with one of chambers 68, 70 and passage 74. Upon thermal expansion of fluid 98 in primary fluid system 64, the fluid flows through isolation orifice 82 into auxiliary fluid chamber 84, formed between flexible compensator element 86 and plate 78 within compensator chamber 66. Isolation orifice 82, however, is preferably sized to dymamically isolate the auxiliary fluid in chamber 84 from the fluid in primary fluid system 64 at the operating frequencies. Thus, auxiliary fluid chamber 84 accommodates the thermal and other expansion of fluid from primary fluid system 64, while being dynamically decoupled from the primary fluid system, thereby maintaining the designed fluid pressure and dynamic characteristics of primary fluid system 64.

Fluid flowing from primary fluid system 64 through isolation orifice 82 is opposed by the volume stiffness of compensator element 86. The term "volume stiffness" refers to the relationship between applied pressure and fluid volume displaced by such applied pressure. Typical units for volume stiffness are expressed in psi/in³. Compensator element 86 advantageously provides a low or soft volume stiffness, typically in the range of about 20 to 200 psi/in³. The volume stiffness of compensator element 86, however, may be designed to suit any particular application.

Compensator element 86 is preferably a one-piece, integrally-formed deformable structure, such as a molded elastomer. The integrally-formed compensator 86 advantageously provides reduced manufacturing cost and ease of assembly, as well as reducing the need for extra stiffening elements and reducing the weight of isolator 20. Compensator element 86 is preferably a flexible material, such as an elastomer, with material selection based upon the fluid to be contained as well as the operating temperature. An elastomer with minimal drift/set characteristics is desired to insure consistent pressure and sealing over the life of isolator 20.

Figure 15:
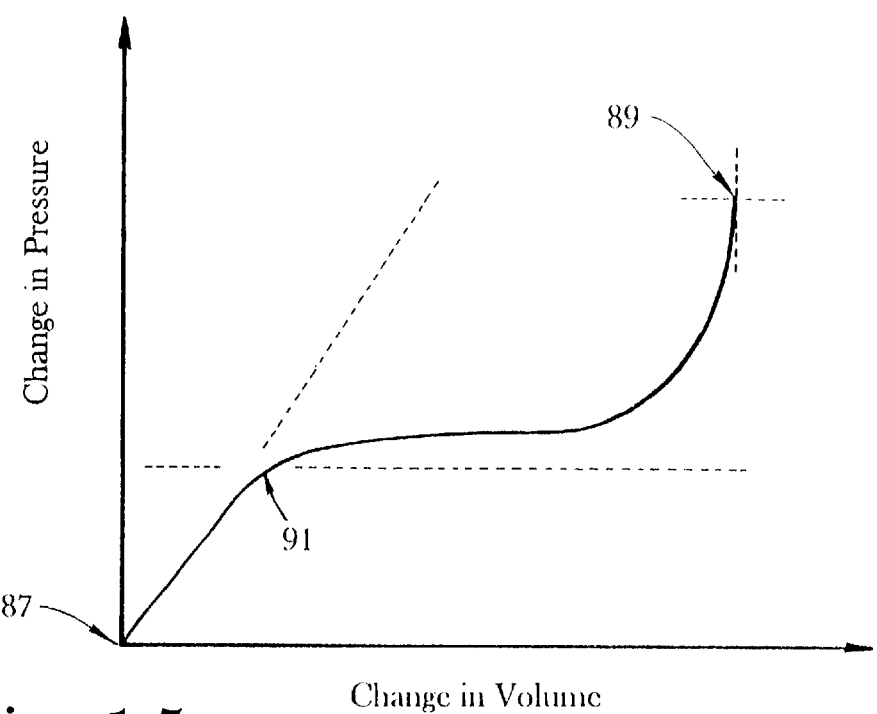
FIG. 15 is a graph of a representative volume stiffness characteristic of a compensator element of the present invention.

Further, referring to FIG. 15, compensator element 86 may preferably provide a reduced rate of change volume stiffness characteristic that prevents excessive static pressure swings in isolator 20 that may prevent its proper function, or may damage the elastomer sections of the isolator. Compensator element 86 preferably exhibits a reduced rate of change in volume stiffness between a point of initial deformation 87 and a point of maximum deformation 89. The rate of change in volume stiffness may initially be constant or increasing, but at a point 91 the rate of change of volume stiffness decreases. The beneficial characteristic of a reduction in the rate of change in volume stiffness allows the fluid pressure to increase at a reduced rate compared to a compensator element having a completely constant or increasing rate of change in volume stiffness, as in prior art compensators. Point 91 may be designed to occur at any point along the volume stiffness curve of compensator element 86. It is typically preferred, however, to allow compensator element 86 to operate primarily within the part of the curve between points 87 and 91, and reserve the reduced rate of change in volume stiffness capability for extreme operating conditions. Thus, during periods of very large fluid volume increases in auxiliary fluid chamber 84, compensator element 86 advantageously exhibits a reduced rate of change in volume stiffness that allows fluid from primary fluid system 64 to more easily expand into the auxiliary fluid chamber without the excessive pressure buildups associated with prior art devices.

Figure 7:
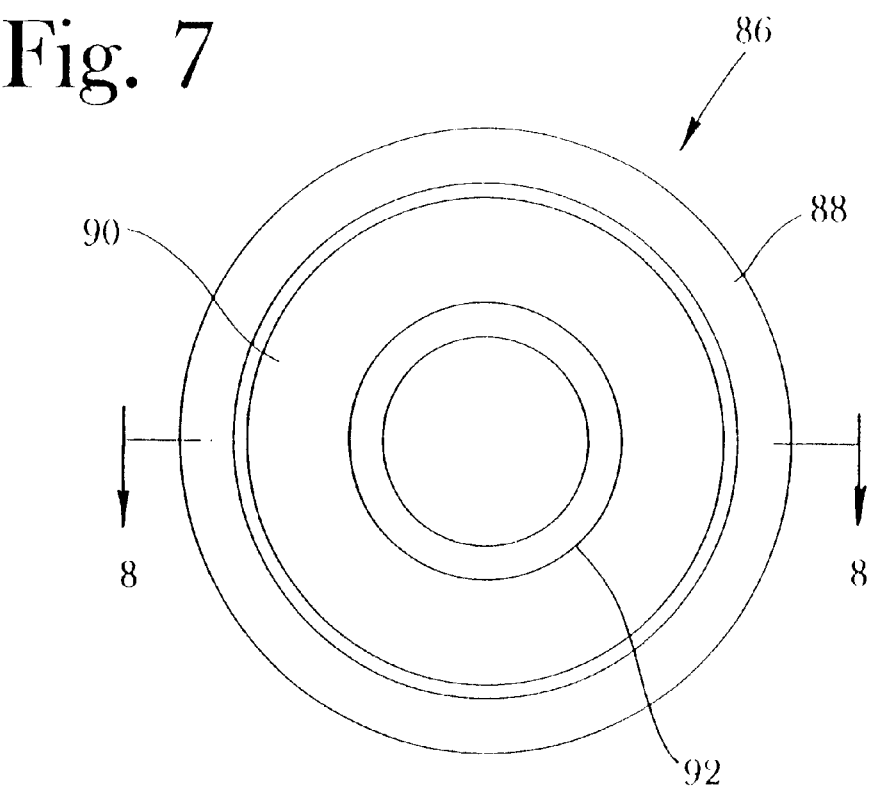
FIG. 7 is a bottom view of one embodiment of a compensator element in accordance with the present invention.

Referring to FIGS. 5–7, compensator element 86 comprises peripheral seal bead 88 along the outside edge, a relatively thick elastic layer 90 to contain the fluid, and. stiffener 92, preferably integrally formed, that acts as a spring to increase the volume stiffness of the compensator element. These features synergistically affect the volume stiffness of compensator element 86 and advantageously allow the compensator element to efficiently provide a designed fluid pressure within primary fluid system 64 over a wide range of operating conditions and temperatures.

Figure 8:
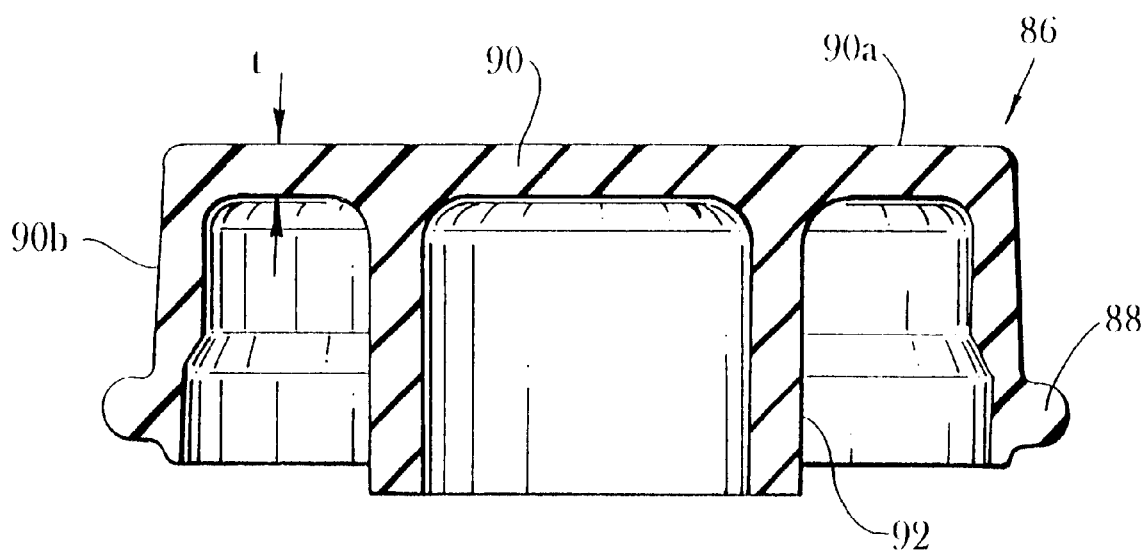
FIG. 8 is a cross-sectional side view of the compensator element along line 8—8 in FIG. 7.

Now referring to FIGS. 7–8, the volume stiffness of compensator element 86 is determined by the combination of the contour of elastic layer 90 along the fluid, the thickness t of elastic layer 90, and by the dimensions and configuration of the intergral stiffener 92, which acts as an additional, integral spring. For example, rather than having a flat top 90a perpendicular to side wall 90b, layer 90 may have a convex, concave or some other shape. Each different shape has a different affect on the volume stiffness of compensator element 86. Additionally, if top 90a or side wall 90b are thicker, for example, the volume stiffness of compensator element will increase. Similarly, increasing the thickness of the corner where top 90a and side wall 90b meet will also increase the volume stiffness. Thus, the contour and configuration of compensator element 86 may be designed to provide particular performance characteristics depending on the operating conditions.

Now referring to FIGS. 5–8, compensator element 86 is installed in compensator chamber 66 (FIG. 6) within pilot 46, and seal bead 88 is radially compressed by sealing plate 96. Compensator element 86 advantageously allows more compensator capacity (versus the prior art) in the same package because the compact radially directed seal provided by seal bead 88 increases the available volume for auxiliary fluid chamber 84 within compensator chamber 66. Sealing plate 96 also provides a surface for the base of stiffener 92 to react against as a spring. Plate 96 is secured in pilot by press fitting, adhesive bonding or threading or by other appropriate means.

Figure 16:
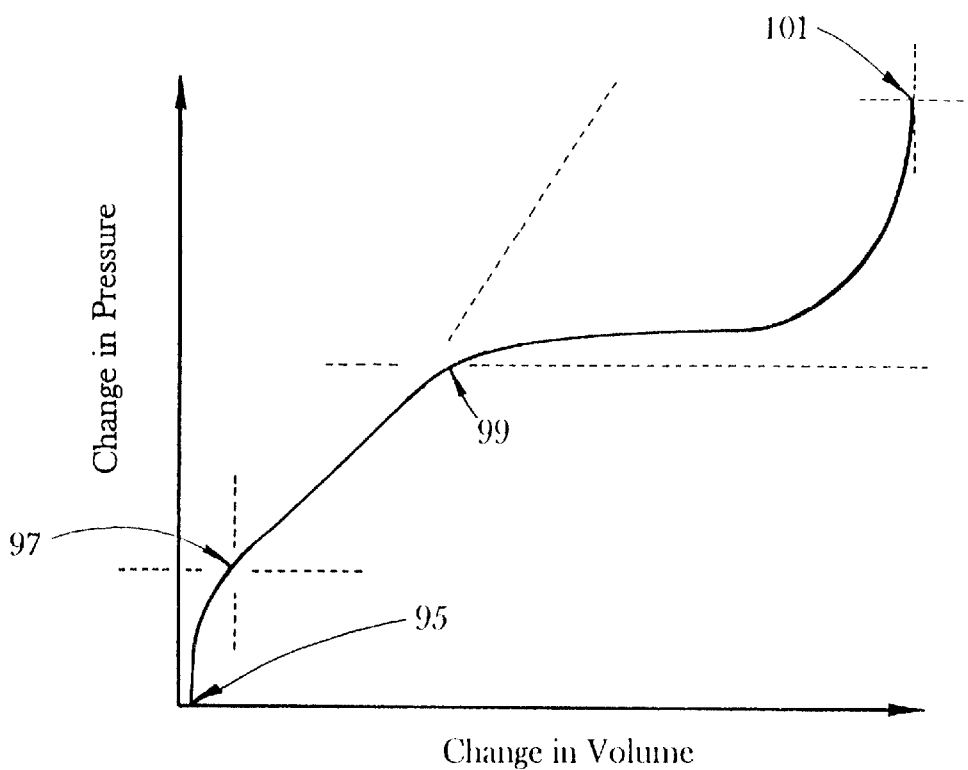
FIG. 16 is a graph of a representative volume stiffness characteristic of a compensator element of the present invention that is subject to pre-compression.

Referring to FIG. 16, by varying the amount of pre-compression of stiffener 92 between sealing plate 96 and orifice plate 78, an additional changing rate in volume stiffness can be obtained. Without pre-compression, the pressure in isolator 20 will be proportional to the volume displaced. With some pre-compression in stiffener 92, the rate of change in volume stiffness of compensator element 86 will be higher for the first small increase in volume until the pre-compression force is equaled by the pressure in isolator 20, such as from points 95 to 97. After point 97, the volume stiffness of compensator element 86 is similar to the volume stiffness without pre-compression. This advantageously allows compensator element 86 to provide a higher static pressure with a small volume displacement, and yet keep the maximum pressure due to maximum volume increase to a minimum. Thus, the pre-compression of stiffener 92 provides multiple rates of change in volume stiffness for compensator element 86 between point 95 and a point of maximum deformation 101.

Referring to FIGS. 5 and 7–8, one embodiment of stiffener 92 uses a single column, which is preferably cylindrical, to increase volume stiffness in compensator element 86 and provide pre-pressure, as discussed above. Stiffener 92 also advantageously provides the reduced rate of change in volume stiffness characteristic, between a point of initial deformation (point 87, FIG. 15) and a point of maximum deformation (point 89, FIG. 15), that reduces the rate of increase in the fluid pressure in primary fluid system 64. The rate of change in volume stiffness of compensator element 86 increases or is constant up to a point (point 91, FIG. 15). At this point, the previously constant or increasing rate of change in spring rate of stiffener 92 now changes at a reduced rate, causing the rate of change in volume stiffness of compensator element 86 to similarly reduce. This reduction in the rate of change in volume stiffness of compensator element 86 causes a resultant decrease in the rate of change of pressure in primary fluid system 64, as fluid flows more freely in-to auxiliary chamber 84. Thus, integral stiffener 92 beneficially provides compensator element 86 with the combination of additional volume stiffness and a reduced rate of change in volume stiffness.

For example, the combination of these two characteristics occurs because the cylindrical column embodiment of stiffener 92 buckles under high displacements/loads. Upon initial deformation (point 87, FIG. 15) up to the point of buckling (corresponding to point 91, FIG. 15), the rate of change in volume stiffness in compensator element 86, and the corresponding rate of change in spring rate of stiffener 92, is constant (although in other embodiments it may be increasing). The rate of change in volume stiffness in compensator element 86 and the rate of change in spring rate in stiffener 92, however, decrease at the point of buckling. The rate of change in volume stiffness in compensator element 86 does not reduce to zero, however, because elastic layer 90 still contributes to the volume stiffness. Thus, the buckling of the cylindrical column allows the rate of change in volume stiffness of compensator element 86 to decrease under these conditions. This results in the overall pressure in primary fluid system 64 increasing at a slower rate.

Figure 9B:
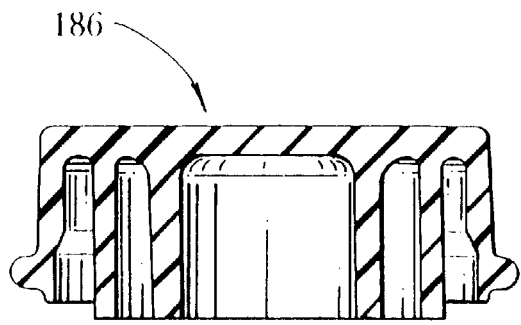
Figure 10B:
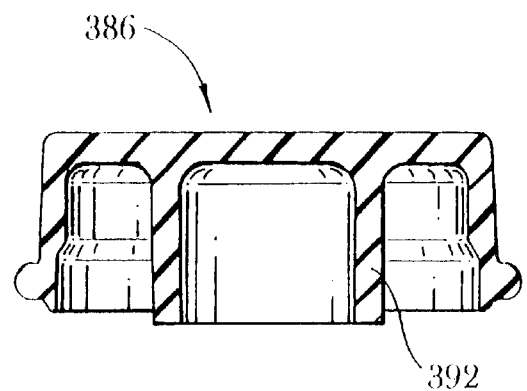
Figure 9A:
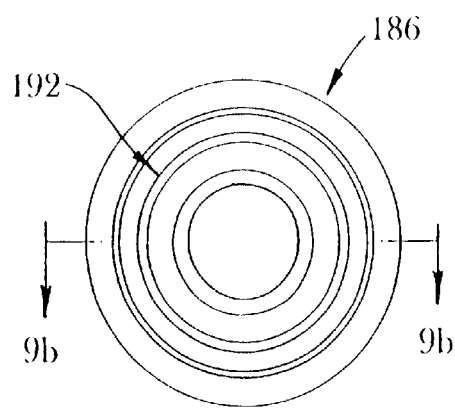
FIG. 9a is a bottom plan view of an alternate embodiment of a compensator element.
Figure 10A:
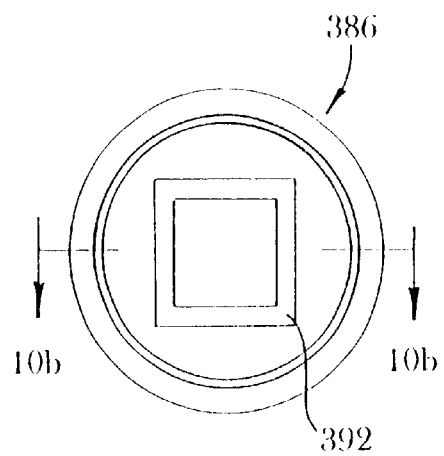
FIG. 10a is a bottom plan view of an alternate embodiment of a compensator element.
Figure 11B:
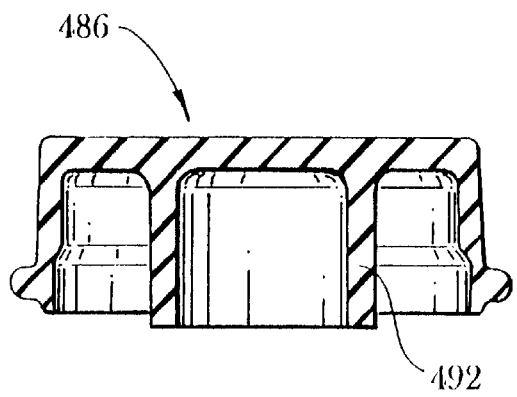
Figure 12B:
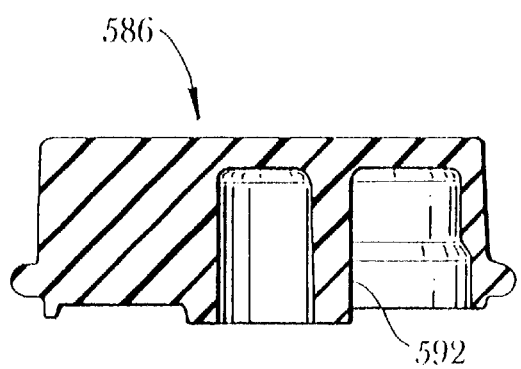
Figure 11A:
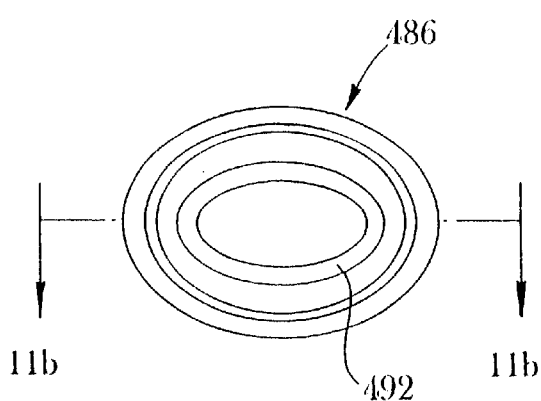
FIG. 11a is a bottom plan view of an alternate embodiment of a compensator element.
Figure 12A:
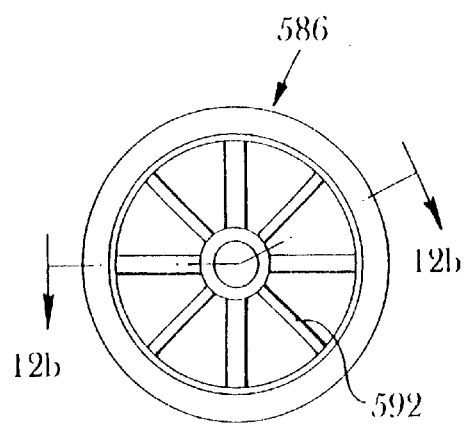
FIG. 12a is a bottom plan view of an alternate embodiment of a compensator element.
Figure 13B:
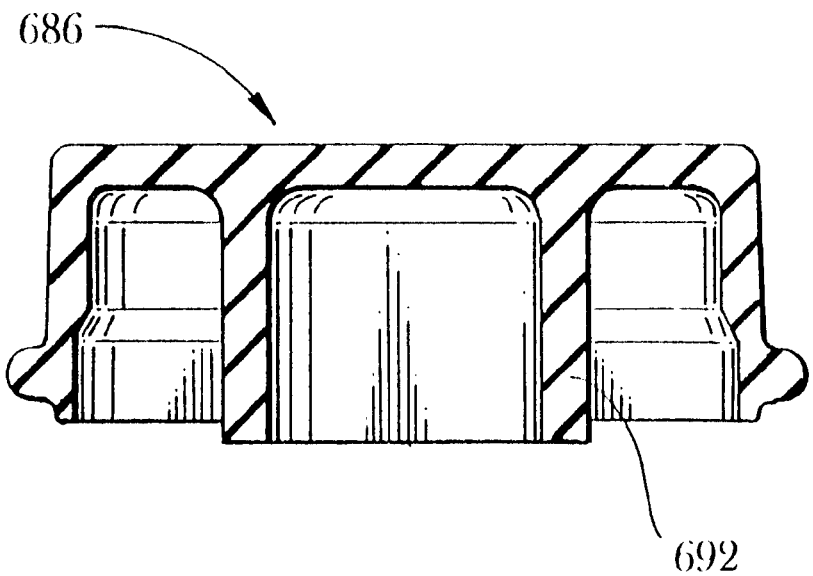
Figure 13A:
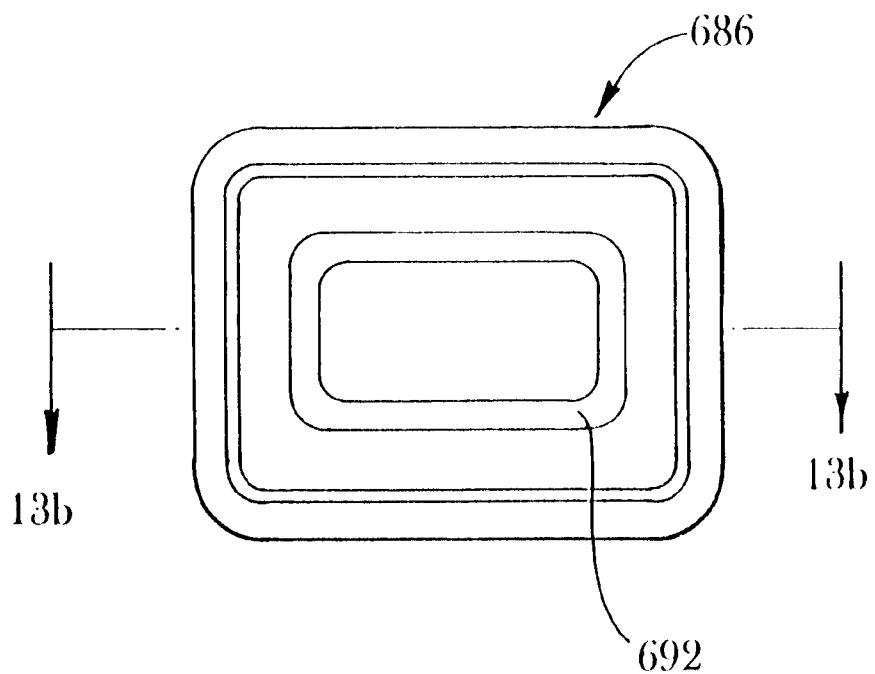
FIG. 13a is a bottom plan view of an alternate embodiment of a compensator element.
Figure 14A:
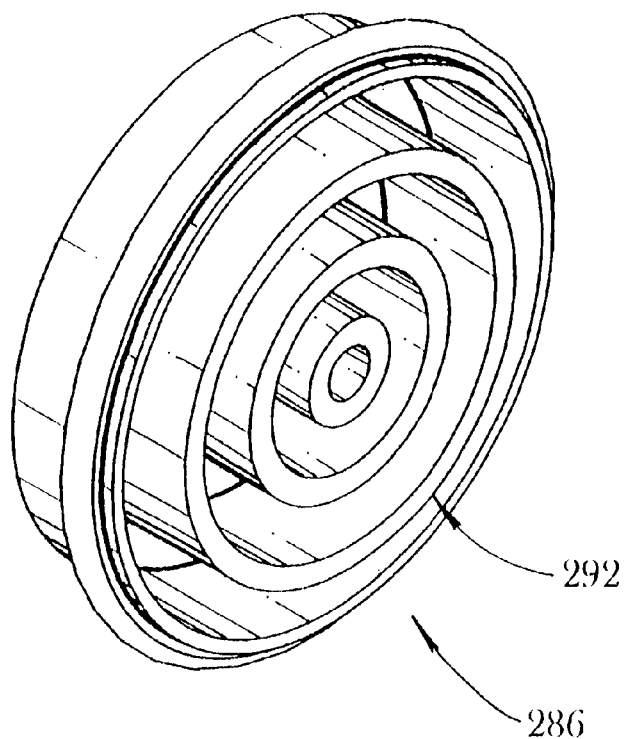
FIG. 14a is a bottom perspective view of an alternate embodiment of a compensator element.
Figure 14B:
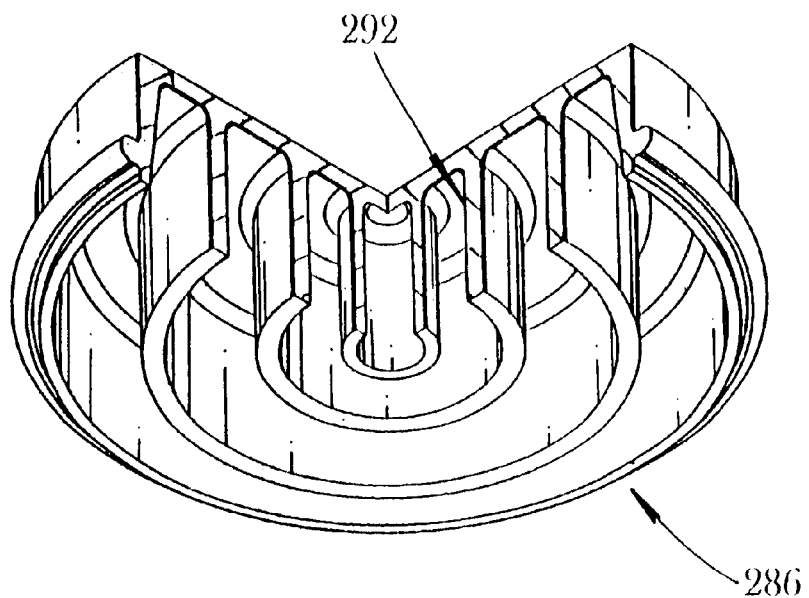

Even though one embodiment of stiffener 92 comprises an integral, single, cylindrical column that increases the volume stiffness of compensator element 86, as well as providing a reduced rate of change in volume stiffness, one skilled in the art will appreciate that other shapes and configurations will achieve the same result. Referring to FIGS. 9a–14b, for example, compensator element 186 may comprise dual, co-axial cylindrical column stiffeners 192 of varying thickness (FIGS. 9a–9b). Similarly, compensator element 286 may comprise multiple, co-axial cylindrical column Stiffeners 292 as in FIGS. 14a–14b. Another embodiment features compensator element 386 having a square column stiffener 392. (FIG. 10a–b). In yet another embodiment, compensator element 486 is oval and comprises an oval column stiffener 492 (FIG. 11a–b). A further embodiment features compensator element 586 having a stiffener 592 comprising a plurality of dividing walls (FIG. 12a–b). Still another embodiment comprises a rectangular compensator element 686 having a rectangular column stiffener 692 ((FIG. 13a–b). Thus, the integral compensator element and stiffener may be comprise a plurality of configurations to suit the particular application and to obtain the desired rate of change in volume stiffness characteristic needed for any particular application. Moreover, various surface contours may be provided on stiffener to achieve buckling in the desired direction, e.g., inward or outward.

Another advantageous feature of the present invention is that isolator 20 is inverted and uncompressed when being filled with fluid 98. Fluid 98 may be any fluid suitable for use in fluid filled isolators, dampers, shock absorbers and other similar devices. Typical examples of such fluids comprise glycol, silicone and perfluorinated polyether, and other similar fluids whose choice depends on the particular application and operating environment. Examples of such fluids for the present embodiment of isolator 20 comprise silicon oil and perfluoral polyether, such as the perfluorinated polyether fluid. Additionally, filling the present invention with fluid 98 demands no special fixtures, as may be required by some prior art devices that are filled in a pre-compressed state. Preferably once housing 26 and elastomer member 14 are sealed and orifice plate 78 is press fit into opening 80, then primary fluid system 64 may be filled with fluid 98.

Referring to FIG. 5, port 100 is formed in orifice plate 78 and serves as the fill port for primary fluid system 64. As the air bleeds from chambers 68 and 70 and passage 74 during the filling process, a small amount of additional fluid is added to chamber 84. The small amount of fluid is enough to just cover plate 78 plus a little more fluid which will squeeze out when compensator element 86 is inserted. At least one isolation orifice 82, but preferably four orifices equally spaced about the circumference of plate 78, allow the air to bleed out of primary fluid system 64 during fluid filling. Port 100 is closed by plug 102, such as a self-locking screw. Compensator element 86 is then installed, forcing out air between it and plate 78, and seal bead 88 is engaged in groove 104 (FIG. 6). Sealing plate 96 is then installed, compressing seal bead 88 between the sealing plate and groove 104. The installation of plate 96 seals off chamber 84 at bead 88, and pre-compresses stiffener 92.

Chamber 106 (FIG. 5), between compensator element 86 and plate 96, is formed by the joining of plate 96 to pilot 46.

The configuration of chamber 106 varies with the configuration of the compensator element and the stiffener. In the preferred isolator 20, compensator element 86 is circular, but as discussed above may be any shape as required by the particular application. Likewise, the shape of stiffener 92 is a cylindrical column, but may vary as also discussed above. Also, based on the embodiment of stiffener 92 in FIGS. 5 and 7–8, chamber 106 additionally comprises an outer annular chamber 106a and an inner columnar chamber 106b, and chambers 106a and 106b are not interconnected. Depending on the application, however, it may or may not be advantageous to interconnect the chambers.

Additionally, chamber 106 is a substantially air-tight, sealed chamber with a preferred pressurization of one atmosphere. A valve (not shown) may be added to pressurize chamber 106, if greater than sea-level atmospheric pressure is desired or required by design. Although substantially air-tight, chamber 106 may lose pressurization during operation without affecting the performance characteristics of isolator 20. This is because the design of compensator element 86 substantially provides the volume stiffness to insure the designed pressurization of the fluid in primary fluid system 64. Thus, the present invention is superior to the pressurized chambers of the prior art due to the advantageous integral stiffening of compensator element 86.

Additionally, referring to FIG. 5, the present invention provides aperture 108 in the top of housing 26 for accessing elastomer member 44. Aperture 108 allows a tool to be used to break bond 56 and separate elastomer member 44 and housing 26. This feature advantageously allows the various components of the present invention to be taken apart, so that, for example, elastomer member 44 may be replaced and housing 26 may be re-used.

As it is installed on engine 22, isolator 20 is pre-compressed because bottom flange surface 46a of pilot 46, which initially projects out from bottom surface 26a of housing 26, is brought into alignment with bottom surface 26a as the mounting bolts are tightened. This pre-compression displaces additional fluid 98 into auxiliary fluid chamber 84, against the opposing volume stiffness of compensator element 86, thereby increasing the static pressure in the fluid 98. The pre-compression is important for extending the life of elastomer member 44 and also advantageously provides additional fluid in chamber 84, which allows for fluid volume shrinkage in isolator 20 due to lower temperatures. Further, the pre-compression advantageously increases the static pressure in isolator 20 to avoid potential cavitation of fluid 98 due to dynamic pressure changes during operation.

In operation, isolator 20 supports engine 22 in the radial direction without undue deflection due to the compressive spring rate of elastomer elements 48 and 52. Elastomer elements 32 and 36 have a sufficient compressive spring rate to support axial loads. Further, isolator 20 will reduce the transmission of vibrations from engine 22 to strut 24 due to the relatively soft spring rate of elastomer elements 32, 36, 48 and 52 in shear for tangentially directed vibrations. As engine 22 and housing 26 move relative to piston element 50 and strut 24, alternatingly compressing elastomer elements 48 and 52 against housing 26 and orifice plate 78, respectively, fluid will be pumped between chambers 68 and 70 through passage 74. This slug of fluid can be designed to resonate at a particular operational frequency that will effectively dynamically soften isolator 20 to reduce the vibration transmitted at or near resonance.

Primary fluid system 64 will be tuned to provide a dynamic softness, or notch, usually at the primary operational frequency, $N_1$, of engine 22. Tuning of primary fluid system 64 is accomplished by varying parameters such as the density of fluid 98, the length and diameter of passage 74, and the volume stiffness of the primary fluid system. Since vibration reduction is most desired at the primary operational frequency, tuning this dynamic stiffness notch will effectively reduce the transmission of engine vibrations to the strut, and hence the fuselage. For an isolator 20 having the above-defined $K_{rad}$, $K_{axial}$ and $K_{tan}$ static spring rates, the effective dynamic stiffness in the tangential and radial directions will be in the range of about 10,000 to 20,000 lb/in at the $N_1$ tone. As stated above, however, the static spring rates and hence the dynamic stiffness will vary depending on the application. Thus, the above-defined range is given as an example and is not intended to be limiting.

While the preferred embodiment of the present invention has been described with reference to an isolator, one skilled in the art will appreciate that the features of the present invention may be successfully applied to all devices having variable volume fluid-filled chambers formed by compensator elements. Thus, it is intended that this disclosure include isolators, mounts, dampers and other similar vibration control devices.

Variations and modifications of the present invention will be apparent to one skilled in the art and the following claims are intended to cover all such modifications and equivalents without departing from the scope of the present invention.

What is claimed is:

1. A unitary compensation element for use with a vibration control device where the vibration control device comprises a housing and at least one fluid-filled chamber, the unitary compensation element comprising:
   an elastic layer configured for fluid communication with said fluid-filled chamber and configured for sealing engagement with a portion of said device and by such sealing engagement thereby contain the fluid within the device; and a deformable elastomer stiffener integral with and extending away from said elastic layer, said elastomer stiffener being cooperative with said elastic layer and configured to provide static pressurization to said at least one fluid-filled chamber.

2. The compensation element as recited in claim 1, wherein said sealing engagement is provided by a seal bead along the perimeter of said elastic layer.

3. The compensation element as recited in claim 2, wherein said stiffener comprises a column.

4. The compensation element as recited in claim 3, wherein said column is cylindrical.

5. The compensation element as recited in claim 2, wherein said stiffener comprises a plurality of columns.

6. The compensation element as recited in claim 5, wherein said plurality of columns are co-axial.

7. The compensation element as recited in claim 1, wherein said compensation element has a reduced rate of change in volume stiffness between a point of initial deformation and a point of maximum deformation.

8. The compensation element as recited in claim 7, wherein said rate of change in volume stiffness decreases at a point corresponding to the substantial collapse of said stiffener.

9. The compensation element as recited in claim 1, wherein said stiffener has a reduced rate of change in spring rate between a point of initial deformation and a point of maximum deformation.

10. The unitary compensation element as recited in claim 1, wherein said deformable elastomer stiffener comprises a rectangular column stiffener.

11. The unitary compensation element as recited in claim 1, wherein said deformable elastomer stiffener comprises a square column stiffener.

12. The unitary compensation element as recited in claim 1, wherein said deformable elastomer stiffener comprises an oval column stiffener.

13. The unitary compensation element as recited in claim 1, wherein said deformable elastomer stiffener comprises at least two co-axially oriented column stiffeners where the column stiffeners are of varying thickness.

14. The unitary compensation element as recited in claim 1, wherein said deformable elastomer stiffener comprises a plurality of radially extending dividing walls.

15. The unitary compensation element as recited in claim 1 wherein an auxiliary chamber is defined by the elastic layer and by an orifice plate.

16. The unitary compensation element as claimed in claim 15 wherein the orifice plate includes a plurality of spaced orifices formed therein along the outer periphery of said orifice plate.

17. The unitary compensation element as claimed in claim 16 wherein said orifices provide for fluid to be supplied from one of the fluid-filled chambers to the auxiliary chamber.

18. The unitary compensation element as claimed in claim 1 wherein the deformable elastomer stiffener is deformable by buckling.

19. A device for controlling vibration and shock between two structures, comprising:
 a housing for fastening to a first structure;
 a variable volume fluid chamber;
 a support for attaching to a second structure, wherein translation between said housing and said support changes the fluid pressure within said chamber; and
 a unitary compensation element comprising an elastic layer in fluid communication with said fluid chamber and disposed in sealing engagement with a portion of said device, and a deformable elastomer stiffener cooperative and integral with said elastic layer for providing static pressurization to said fluid chamber.

20. The device for controlling vibration and shock as recited in claim 19, further comprising a seal bead along the perimeter of said elastic layer.

21. The device for controlling vibration and shock as recited in claim 19, wherein one end of said chamber is sealed at said housing with a bond formed with an adhesive.

22. The device for controlling vibration and shock as recited in claim 19, wherein said compensation element has a reduced rate of change in volume stiffness between a point of initial deformation and a point of maximum deformation.

23. The device for controlling vibration and shock as recited in claim 22, wherein said rate of change in volume stiffness decreases at a point corresponding to the substantial collapse of said stiffener.

24. A double-action fluid mount comprising:
 a primary fluid system defined by a first variable volume fluid chamber fluidly interconnected to a second variable volume fluid chamber;
 a volume compensator having an auxiliary chamber fluidly connected to, but dynamically isolated from, said primary fluid system; and
 a unitary compensator element comprising an elastic layer in fluid communication with said auxiliary chamber and disposed in sealing engagement with said volume compensator and by such sealing engagement thereby containing the fluid within the mount, and a deformable elastomer stiffener cooperative with said elastic layer for providing static pressurization to said primary fluid system.

25. The double-action fluid mount as recited in claim 24, wherein said stiffener comprises at least one cylindrical column.

26. The double-action fluid mount as recited in claim 24, wherein said compensator element has a reduced rate of change in volume stiffness between a point of initial deformation and a point of maximum deformation.

27. The double-action fluid mount as recited in claim 26, wherein said rate of change in volume stiffness decreases at a point corresponding to the substantial collapse of said stiffener.

28. The double-action fluid mount as recited in claim 24, wherein said stiffener has a reduced rate of change in spring rate between a point of initial deformation and a point of maximum deformation.

29. The double-action fluid mount as recited in claim 27, further comprising:
 a housing for attachment to a first structure;
 an elastomer member within said housing, said elastomer member at least partially forming said first chamber and said second chamber;
 a piston dividing said first chamber and said second chamber;
 a support, connected to said piston, for attachment to a second structure;
 a seal bead formed at the perimeter of said elastic layer that seals one end of said auxiliary chamber; and
 wherein an adhesive bond between said housing and said elastomer member seals one end of one of said variable volume fluid chambers.

30. The device for controlling vibration or shock as recited in claim 29, further comprising a seal bead along the perimeter of said elastic layer.

31. The device for controlling vibration or shock as recited in claim 29, wherein one end of said chamber is sealed at said housing with a bond formed with an adhesive.

32. The device for controlling vibration or shock as recited in claim 29, wherein said compensation element has a reduced rate of change in volume stiffness between a point of initial deformation and a point of maximum deformation.

33. The device for controlling vibration or shock as recited in claim 31, wherein said rate of change in volume stiffness decreases at a point corresponding to the substantial collapse of said stiffener.

34. A device for controlling vibration or shock between two structures, comprising:
 a housing for fastening to a first structure;
 a variable volume fluid chamber;
 a support for attaching to a second structure, wherein translation between said housing and said support changes the fluid pressure within said chamber; and
 a compensation element comprising an elastic layer in fluid communication with said fluid chamber and disposed in sealing engagement with a portion of said device, and a deformable elastomer stiffener cooperative with said elastic layer for providing static pressurization to said fluid chamber.

* * * * *